Nov. 25, 1941.	M. B. BRIGGS	2,264,111
STABILIZER
Filed July 2, 1937	5 Sheets-Sheet 1
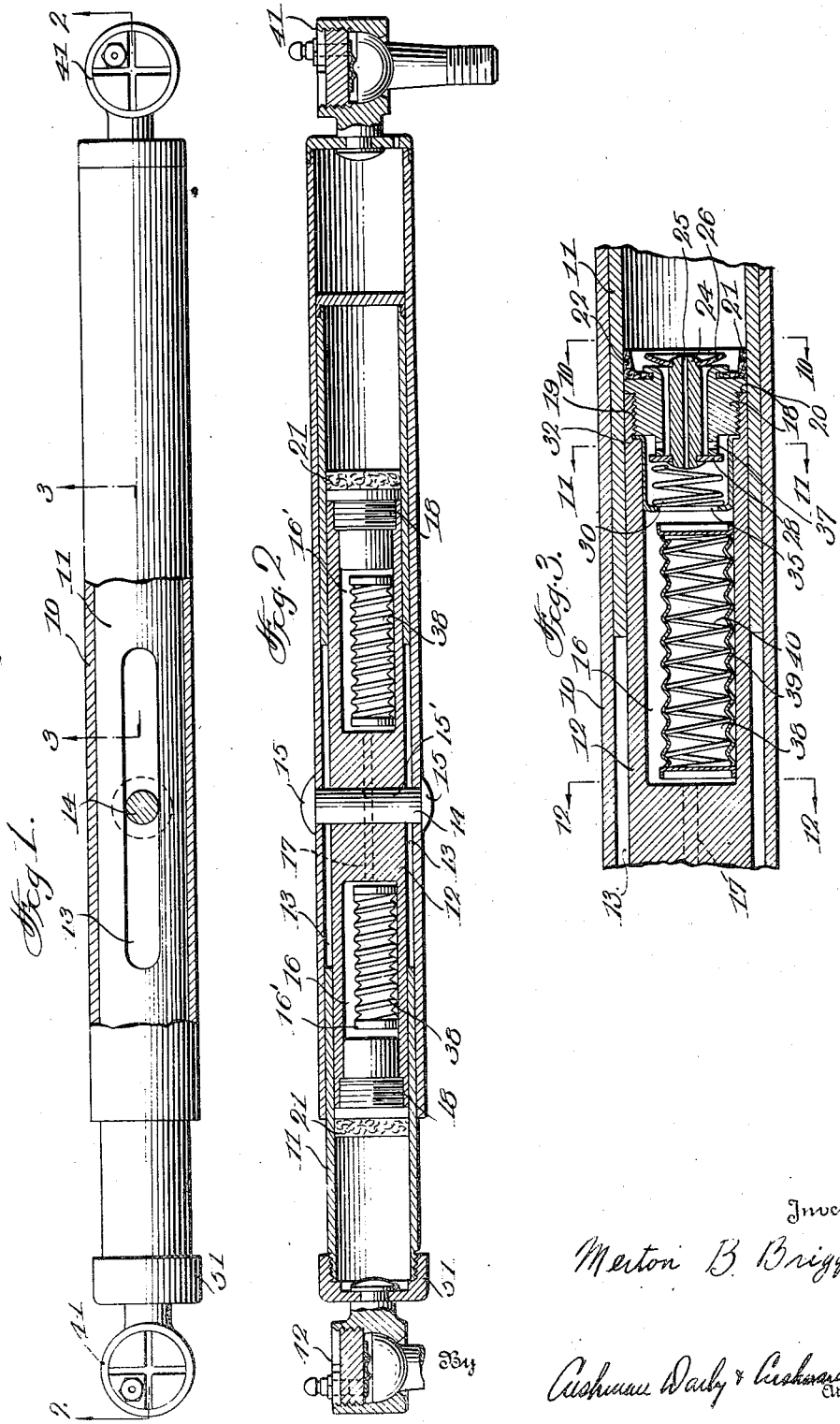

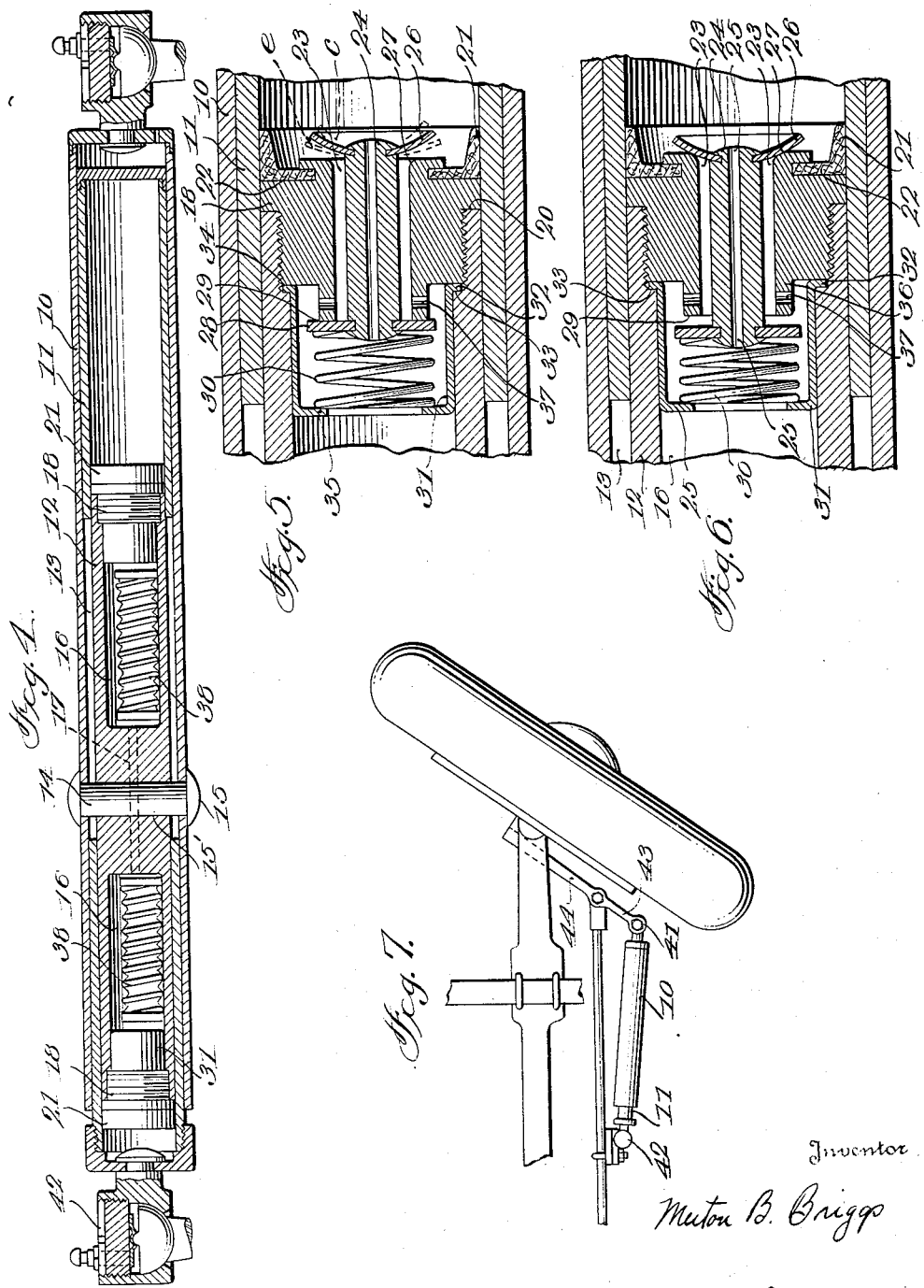

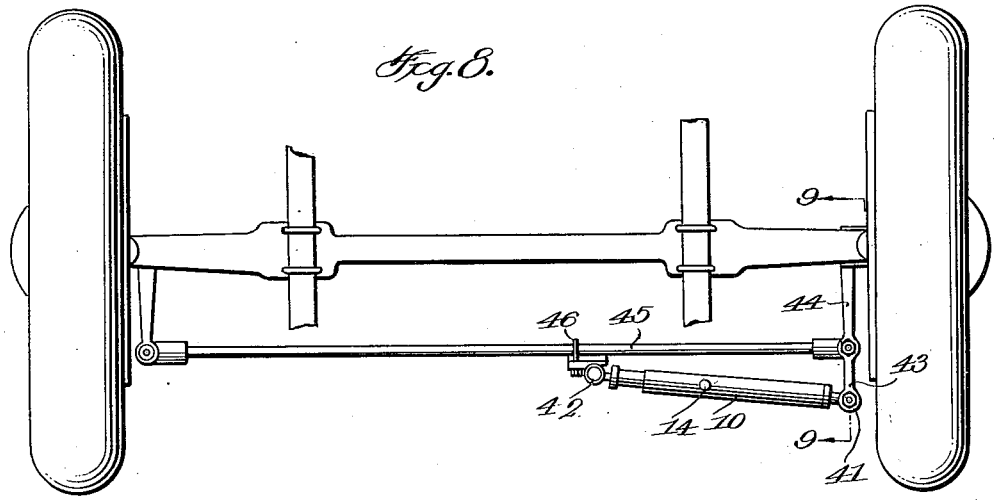
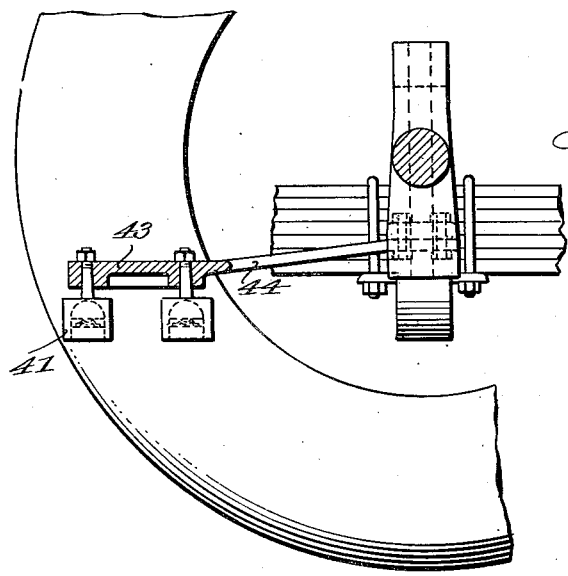
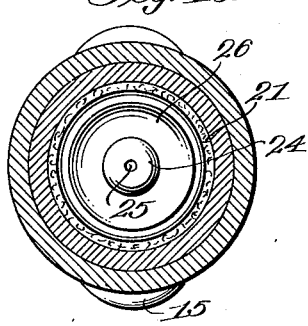
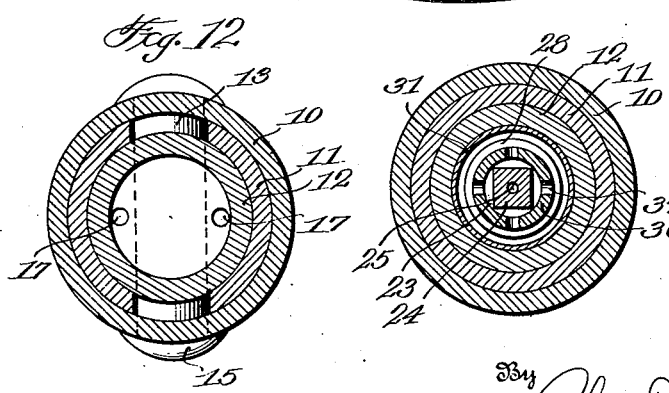

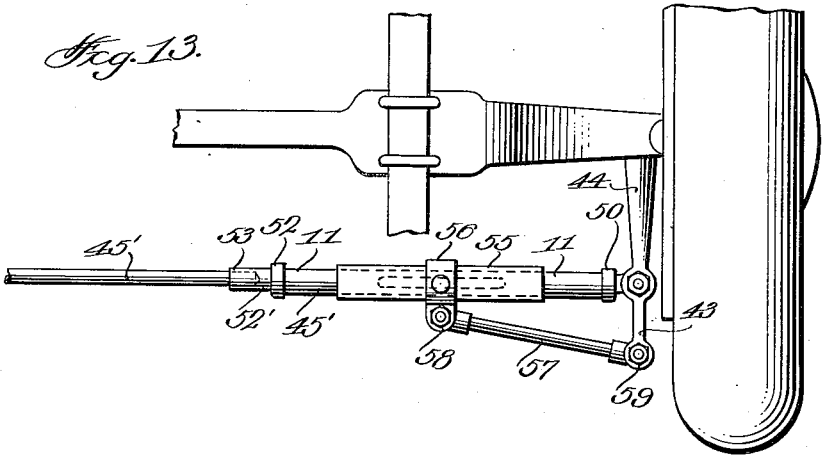
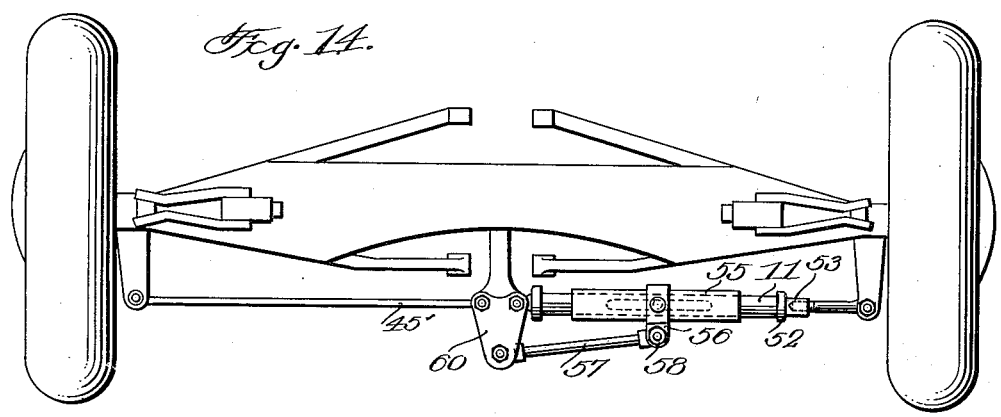
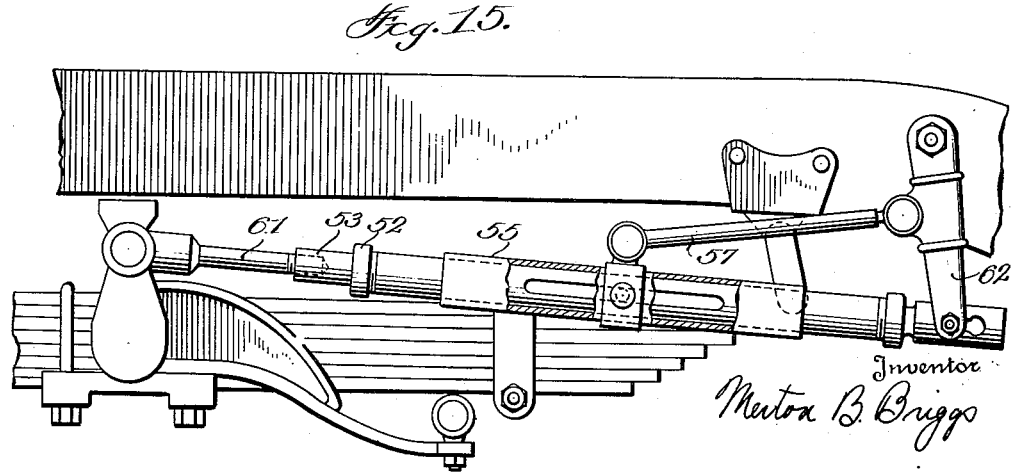

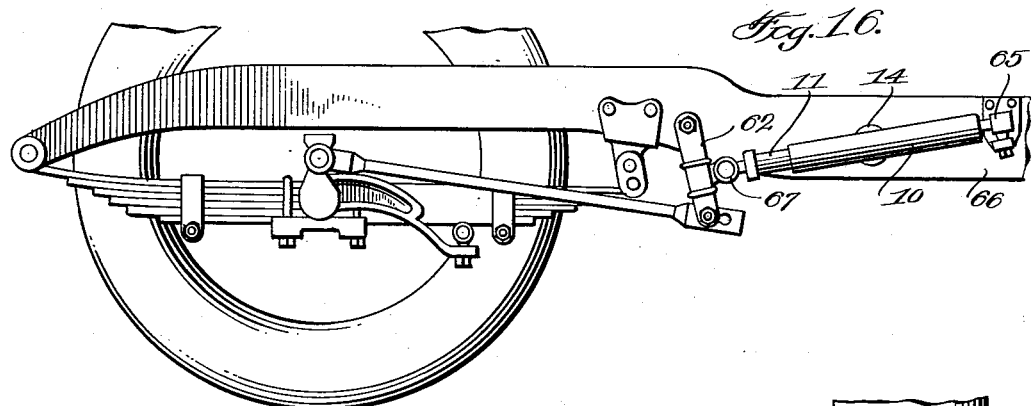
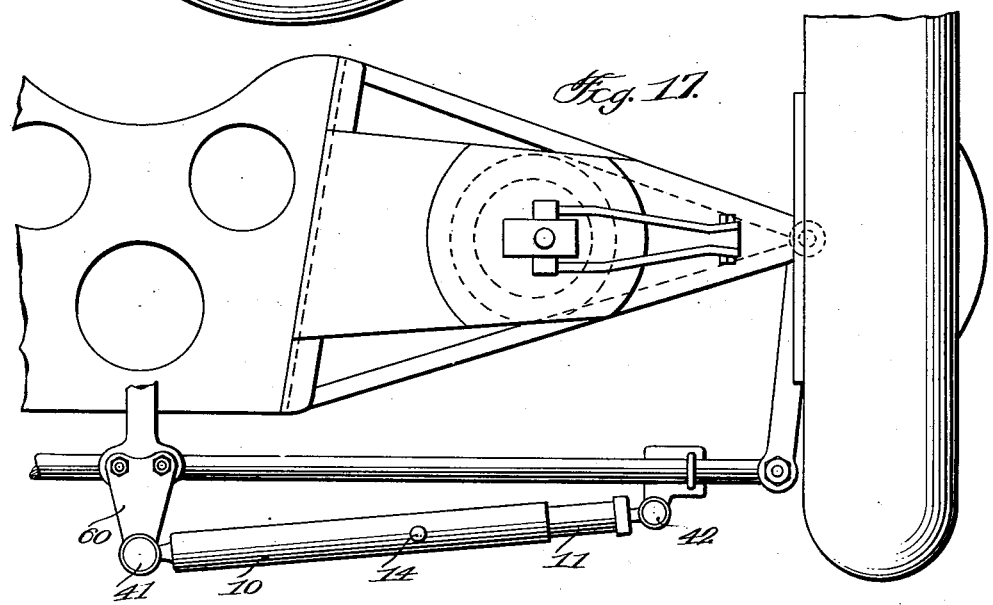
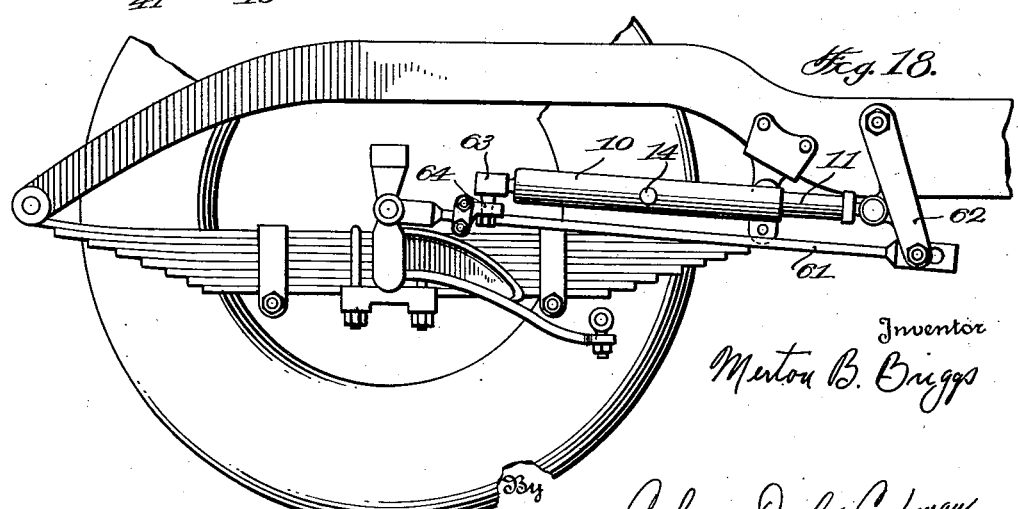

Patented Nov. 25, 1941

2,264,111

UNITED STATES PATENT OFFICE 2,264,111

STABILIZER

Merton B. Briggs, Pittsburgh, Pa., assignor to I. A. Simon, Pittsburgh, Pa.

Application July 2, 1937, Serial No. 151,755

17 Claims. (Cl. 280—90)

The present invention relates to a stabilizing unit, and the mounting of the same with relation to a structure having relatively moving parts. Particularly, the invention is useful in association with the steering mechanism of motor vehicles. In such association, it prevents the effects of shimmying and vibration being translated to the steering wheel, and more particularly prevents sharp deflection or swerving of the front wheels due to the vehicle encountering hazardous road conditions, blow-outs, ruts, mud-holes, soft shoulder, etc. It is well known that many accidents are attributable to sudden shocks imparted to the front wheels of the vehicle due to the above and other causes, whereby control is wrested from the driver. It is therefore the primary object of the invention to provide a stabilizer which will instantaneously check or arrest any abnormal tendency of the wheels to deviate from the chosen course, but which does not interfere with normal driving.

The stabilizing unit is hydraulically actuated and is an improvement upon the piston-cylinder type construction shown and described in the United States patent to MacLellan, 2,058,384, October 20, 1936.

A further object of the present invention is to provide a unit which is (1) adaptable to vehicles now in use, without substantial alteration of the vehicle structure and at a minimum of expense, and (2) easily and economically built into the steering mechanism of a motor vehicle, e. g., the tie rod or drag link of the steering structure.

Another object of the invention is to maintain the working cylinder constantly filled with the operating fluid and to accomplish this, I provide means for compensating for volume changes in the fluid due to climatic and temperature variations as well as slight leaks which may occasionally develop without being immediately discovered. Such means are pressure controlled and are automatically operable to expand and contract as the fluid decreases and increases in volume.

An additional object of the invention is to provide valve means for compensating for changes in viscosity of the hydraulic fluid whereby the flow resistance is constant at all times. This means is also automatic and thermally operative so that regardless of the viscosity of the hydraulic fluid due to temperature variations, a constant flow resistance is maintained.

Another feature of the stabilizing unit of this invention is the reduction to a minimum of friction between its moving parts whereby there is complete freedom during normal driving, and if a sudden shock is encountered, the action of the stabilizer is immediate to check any deflection of the steering wheels.

A highly important advantage of the present invention is that regardless of the wheel base of the vehicle upon which it is used or the particular type of steering mechanism or wheel mounting, the stroke of the piston is of constant length. That is to say, the stabilizer is so positioned between the parts that a constant length of travel of the piston relative to the cylinder is obtained. This feature of the invention allows the stabilizer to be applied universally without requiring any changes either in the unit for a particular vehicle, or any substantial changes in the design of the wheel mounting or steering mechanism.

As previously explained, the adaptability of the present invention is of the greatest importance in assuring its universal utility. Thus, with the usual rigid front axle structure, the stabilizer is connected between an extension of the steering knuckle arm and the tie rod. In this connection, the stabilizer can be incorporated in or built into the tie rod and an actuating link provided for connecting the stabilizer with the extension of the steering knuckle arm. In the case of a front wheel suspension of the knee action type, the stabilizer is connected at one end to the tie rod and at its other end to an extension of the actuating arm which usually is centrally disposed with relation to the tie rod. As an alternative, the stabilizer may be incorporated into the tie rod and a link employed connecting the tie rod with the aforesaid extension. Again, as a further alternative, the stabilizer is attached to the pitman or steering arm which is actuated from the manual steering wheel. Thus, the stabilizer is connected at one end to the fixed frame of the vehicle and at its opposite end to the pitman arm, or it may be connected at one end to the pitman arm and at its other end to the drag link, or it may be built into the drag link structure and operably connected by a link to the pitman.

A feature of the invention contributing to its reliability resides in having all of the working parts completely enclosed so that the stabilizer cannot be damaged by flying stones, dust, mud, ice or corrosion due to climatic elements.

Another feature of the invention is the leak-proof character of the stabilizing unit; in fact, the unit is substantially sealed and being made of few parts and of rigid structure, is thoroughly safe and will have a long life.

In the accompanying drawings I have illustrated the stabilizer unit and its mounting in association with the more general types of steering mechanisms and wheel mountings. Various modifications may, of course, be resorted to and are considered to be within the scope of the present invention, since it will be appreciated that it would be inconvenient to show a stabilizer unit associated with every type of steering mechanism and wheel mounting.

In the drawings,

Figure 1 represents a plan view of the stabilizer partly broken away to show the cylinder construction;

Figure 2 is a sectional view taken on line 2—2 of Figure 1;

Figure 3 is a sectional view of the valve structure taken on line 3—3 of Figure 1;

Figure 4 is a sectional view showing the relation of the various parts when the front wheels have been turned to their extreme right as in Figure 7;

Figure 5 is an enlarged sectional view showing the valve structure in open position;

Figure 6 is an enlarged sectional view showing the valve structure in closed position;

Figure 7 shows a plan view of the stabilizer mounted on the conventional rigid axle front wheel construction with the wheels turned to their extreme right;

Figure 8 is a plan view showing the wheels in their intermediate position;

Figure 9 is a side elevation partly in cross-section of the front wheel pivot lever taken on the line 9—9 of Figure 8;

Figure 10 is a cross-section of the stabilizer unit taken on line 10—10 of Figure 3;

Figure 11 is a cross-section on the line 11—11 of Figure 3;

Figure 12 is a cross-section on the line 12—12 of Figure 3;

Figure 13 is a plan view showing the stabilizer built into the tie rod of the conventional rigid axle front wheel construction;

Figure 14 is a plan view showing the stabilizer built into the tie rod of a knee action steering mechanism;

Figure 15 is a side elevation partly broken away showing the stabilizer built into the drag link of the steering mechanism that connects the steering arm or pitman and the knuckle thrust arm;

Figure 16 is a side elevation showing the stabilizer mounted between the steering arm or pitman and the frame of the car;

Figure 17 is a plan view showing the stabilizer mounted on a knee action steering mechanism and connected between the tie rod and an extension of the tie rod actuating lever, and Figure 18 is a side elevation showing the stabilizer mounted between the steering arm or pitman and the drag link.

The stabilizer unit

In Figures 1 to 6 and 10 to 12, I have illustrated in detail the construction of my improved stabilizer unit.

This device is preferably made of metal and includes a sleeve or dust guard 10 closed at one end, within which is slidably and relatively loosely mounted a cylinder 11 closed at each end as shown, and containing a suitable hydraulic operating fluid, e. g., an oil such as "Calumet Pale #65." One end of the cylinder extends beyond the open end of the sleeve 11 in the form shown in Figures 1 and 2. Disposed within the cylinder is a piston 12 which is moved with relation to the cylinder by connection with the sleeve 10. For this purpose, the cylinder is slotted diametrically as shown at 13 and a stud 14 having its ends turned over as shown at 15 upon the outside of the sleeve, passes through the sleeve, the slots 13 and a transverse opening 15' in the piston to lock the sleeve and piston together so that they are movable relative to the cylinder 11 in the operation of the device. The sleeve 10 in any case is just long enough to cover the slot and acts as a dust cover.

The piston is provided at opposite ends with a pair of chambers 16 connected by passageways 17 shown in dotted lines in Figure 2 and in section in Figure 12. At their ends, the chambers are closed by plugs 18 threaded as at 19 to the inside wall of each chamber. These plugs each have a shoulder abutting the adjacent end of the piston as shown at 20. A suitable cup-shaped packing ring 21 is fitted in a groove 22 on the outer end of each plug and forms a leak-proof seal with the wall of the cylinder as the piston moves therein.

Referring to Figures 5 and 6, it will be noted that each plug member is provided with a central longitudinally extending opening 23 within which is disposed a floating type of valve member 24 which may be squared as shown or serrated, to provide passages between the body of the member and the wall of the opening as shown in Figure 11. These valve members are provided with central bleeding openings 25. At one end, each valve member has secured thereto, a cup-shaped disc valve 26 adapted to engage a seat 27 on the outside of the plug. At its other end, each valve member carries a washer 28 adapted to engage the seat 29. In the normal driving position of the stabilizer unit, the washers close the openings in the plugs while the valve discs 26 are free of their seats as shown in Figure 5. Bearing upon each washer is a spring 30 which is mounted in a cage 31 having one end flanged as shown at 32 and locked in position between the inner side of the plug member and the internal shoulder 33 of the chamber wall as shown at 34. At its other end the cage is open and the opening is of a smaller diameter than the diameter of the spring 30 and the end 35 of the cage therefore serves with the washer 28 to confine the spring. When an abnormal driving condition occurs, the hydraulic pressure acting upon one valve disc 26 forces it upon its seat 27 and moves the washer on the other end of the valve member from its seat against the action of the spring 30 as shown in Figure 6, so that the outer end of the opening 23 is closed except for the bleeder opening 25. Each plug member is formed with an extension 36 in which are formed lateral openings 37 communicating with the opening 23 in the plug member and with the chamber defined by the cage 31.

As will be appreciated, each side of the piston 12 is precisely the same in construction so that in the normal operation of driving, as the piston reciprocates within the cylinder, the hydraulic fluid will move back and forth from one side of the cylinder to the other. The flow through the piston in either direction is the same, the fluid passing from the adjacent end of the cylinder into and through the openings 23, 25 and 37, into the cage 31, and thus into the adjacent piston chamber 16. The fluid then passes through the ports 17 in the piston to the opposite piston chamber 16 and follows a similar path through the plug and valve member at the opposite end of the piston and into the adjacent end of the cylinder.

The valve discs 26 are of thermally responsive material, e. g., bimetallic, to take care of a decrease or increase in viscosity of the hydraulic fluid which is usually a mineral oil and subject to changes in viscosity due to temperature variation. By so constructing the discs, when the hydraulic fluid is highly viscous at reduced temperatures, they will be contracted as shown in dotted line at c in Figure 5 so as to present substantially large entrance areas at the outer ends of openings 23 for the passage of fluid, whereas when the temperature is elevated, and the fluid is relatively less viscous, the valve discs expand as shown in dotted lines at e in Figure 5 so as to reduce the entrance areas of the openings. In this manner, a constant flow resistance is maintained at all times regardless of viscosity of the hydraulic fluid.

Located in each of the piston chambers 16 is an automatic compensating device, to take care of any changes in volume of the hydraulic fluid. It is preferred of course to have the cylinder completely filled with the hydraulic fluid or at least at a working maximum. Due to climatic conditions, temperature changes, and at times some slight leakage, the volume of the hydraulic fluid decreases. At other times, the volume increases as, for example, at elevated temperatures. In order to compensate for such conditions I provide a pressure sensitive device 38 as shown in Figures 2 and 3. This device includes a closed bellows casing 39 within which is disposed a spring 40. Thus, when the volume of the hydraulic fluid is less than the prescribed maximum, the bellows will expand to take care of the reduction in volume, and when the volume of hydraulic fluid increases, the pressure will serve to contract the bellows. In this manner, the invention is rendered always reliable, there is no possibility of jamming of the parts, and no void spaces are formed which would interfere with the instantaneous actuation of the discs 26.

*The operation of the stabilizer*

I will describe in detail the operation of the stabilizer with one type of steering mechanism and wheel mounting which, it is to be understood, is characteristic of its operation in connection with other types of steering mechanism and mountings.

Referring to Figure 8, I have shown the device of Figures 1, 2 and 3 connected to the steering mechanism associated with the usual rigid front axle. In this embodiment, the sleeve 10 is provided with a ball and socket or universal joint connection 41 at one end while the cylinder is provided with a similar connection 42 at its free end. The sleeve is connected to an extension 43 of the steering knuckle arm 44, while the cylinder is connected to the tie rod 45 as shown at 46. These connections may be reversed if desired. It will be noted that both the knuckle arm and the tie rod are movable members.

In the normal driving, fluid passes from one end of the cylinder to the other in the manner above described. This movement of the hydraulic fluid is free, since the valve discs 26 are in their open positions as shown in Figures 3 and 5.

However, when the front wheels for any reason are subjected to a shock which might normally cause them to suddenly deflect from the chosen course, the sleeve 10 and piston 12 are caused to sharply move in one direction or the other as the case may be relative to the cylinder 11. If the deflective force tends to move the wheels to the right, the sleeve and piston being connected to the extension 43, the inward movement of the sleeve and piston is to the left and is faster than the inward movement to the left of the cylinder 11 which is connected to the tie rod. Referring to Figures 2 and 8, there is built up on the left hand side of the cylinder a pressure which instantaneously acts against the adjacent valve disc 26 to force it upon its seat 27. This instantaneous action is accelerated by the resistance offered to the flow of oil through the opening 23, which resistance simultaneously moves the valve member 24 inwardly as shown in Figure 6 until the disc 26 is seated. In this manner, the disc 26 instantaneously closes the opening 23. This sudden closing of the opening, as will be understood, closes the passage of fluid through the stabilizer, locking the sleeve and piston with relation to the cylinder, and thus prevents relative movement between the steering knuckle arm 44 and its extension 43 on the one hand, and the tie rod 45 on the other, whereby swerving of the vehicle from its course is prevented. The bleeder opening 25 which is never closed is of relatively small diameter, but is sufficient to pass fluid at a speed and in sufficient volume to immediately release the pressure after the forces which caused the valve to close have dissipated. This allows the spring 30 to move the valve member 24 outwardly and lift the valve 26 from its seat 27. That is, the bleeder will release the pressure on the high pressure side of the piston, to return the working parts to normal position and equalize the hydraulic pressure in the stabilizer. The driver will thus have normal control of the steering of the vehicle. The instantaneous actuation of the parts as just described, i. e., the checking and releasing action of the disc 26 of the stabilizer is such, that it will take care of a multiplicity of immediately recurring shocks tending to deviate the wheels toward either side. Moreover, it will be appreciated that the operation of the stabilizer will arrest shimmying and other vibrations which are the causes of a driver losing control of the vehicle.

By having the extension 43 on the steering knuckle arm, a convenient means is provided for mounting the stabilizer and also for controlling the stroke of the piston so as to assure that the stabilizer unit will not interfere with normal driving, but will always immediately operate as just described to instantaneously arrest any tendency of the wheels to suddenly deflect.

While I have illustrated in Figure 8 the stabilizing unit as an attachment, it can be built into the steering mechanism, for example, as shown in Figure 13. In this view, the cylinder 11 is built into and forms one section 45' of the tie rod, and is closed at one end 50 as shown at 51 in Figure 2 and provided with a pivoted or ball connection to the steering knuckle arm 44. At the other end, the cylinder is closed by threaded cap 52 engaging the cylinder, which member has an extension 52' provided with a threaded recess 53 for receiving the other section 45' of the tie rod. In this construction, the sleeve 55 is open ended and slidably fits over the piston cylinder 11. The movement of the sleeve and piston is achieved by securing to the sleeve substantially intermediate its length a connecting band 56, this band being connected to the extension 43 by a link 57 having a universal or ball connection with the band as shown at 58 and with the extension as shown at 59. The construction of the stabilizer is otherwise similar to that previously described and its operation is likewise identical.

In Figures 14 and 17, I have illustrated the stabilizer in connection with a knee action type of wheel mounting. In Figure 14, the stabilizer is built into one of the sections 45' of the tie rod in the same manner described in connection with Figure 13 and the sleeve 55 is operated by means of the link 57 which is connected to an extension 60 of the tie rod operating lever. The link connections are universal as previously described. In Figure 17, the stabilizer has the cylinder end connected by a universal joint to the tie rod and the sleeve end connected by a universal joint to an extension 60 of the tie rod operating lever.

In Figure 15, the stabilizer unit is built into the drag link 61 of the steering mechanism and the sleeve 55 is connected by a link 57 with the usual steering arm or pitman 62. The link connections are also provided by universal joints as heretofore described. In Figure 18, the cylinder end of the stabilizer unit is connected by a universal joint to the pitman or steering arm 62, while the sleeve end is connected by a universal or ball joint 63 with the drag link 61 as shown at 64.

In Figure 16, the steering stabilizer unit has its sleeve end connected by a universal or ball joint 65 to the frame 66 of the vehicle, and its cylinder end connected by a universal or ball joint 67 with the pitman or steering arm 62.

As will be appreciated, the stabilizer device may be associated with other types of steering mechanisms and wheel mountings. It will be noted that in all of the views except Figure 16, the unit is connected between relatively movable members, while in Figure 16, one end of the stabilizer is attached to the fixed frame of the vehicle. In all cases, the stabilizer operates in a manner heretofore described to instantly check sudden forces tending to deviate the wheels from their chosen path and wrest control of the vehicle from the driver.

In connection with the various applications of the stabilizer unit as shown and described herein, it is an important feature of the invention, that the stroke of the piston in any case is always constant. This is made possible with the constructions shown in Figures 8, 13, 14 and 17 by means of the extensions 43 and 60 respectively, enabling the stabilizer unit to be disposed in proper adjusted relation to the movable members which exert a scissoring effect. By means of this construction, and regardless of the wheel base of the vehicle, the stroke of the piston is the same, and the infinitesimal time period that elapses between a shock and the closing of the valve is equal. In other words, the present invention eliminates the necessity for building individual stabilizers for each model and make of car on account of differences in wheel base or changes in design of the steering mechanism or the wheel mounting. That is, with the present construction, which may be connected between two relatively movable parts of the steering mechanism, e. g., the steering knuckle arm 44 and the tie rod 45, or the extension 60 of the tie rod operating member and the tie rod, the necessity for individually designed stabilizers is eliminated.

Where the stabilizer is built into the tie rod, or the drag link, and is connected to one end of the link 57, the other end of the link can be positioned to similarly control the stroke of the piston so that it will be constant for all types of motor vehicles.

In the construction shown in Figure 18, the constant stroke of the piston is controlled by the relative positioning of the cylinder end of the stabilizer longitudinally of the steering or pitman arm 62.

The construction shown in Figure 16, indicates one manner in which the stabilizer of this invention may be connected to a fixed part, namely, the frame, and the piston have a constant stroke. This is obtained by adjusting the connection 67 longitudinally of the pitman or steering arm 62.

I claim:

1. A stabilizer comprising a sealed fluid containing cylinder, a substantially non-compressible hydraulic fluid in said cylinder, a double acting sleeve disposed about the cylinder and movable with respect thereto, and a piston movable within the cylinder, said piston having movement imparted thereto by said sleeve, said piston being fixedly connected between its ends to said sleeve, and compensating means within the cylinder to render the resistance of the fluid to movement of said piston through the cylinder constant, even though atmospheric temperature variations alter certain qualities of the liquid.

2. A construction in accordance with claim 1 having means for automatically closing the passage of fluid when sudden relative movement is imparted to the sleeve and piston.

3. A construction in accordance with claim 1 having valves for controlling the passage of fluid which are normally opened but are automatically closed when sudden relative movement is imparted to the sleeve and piston.

4. A construction in accordance with claim 1 in which the piston is provided with valves at each end normally opened but automatically closed when sudden relative movement is imparted to the sleeve and piston, said valves being thermally responsive.

5. A construction in accordance with claim 1 having means in said piston for compensating for volume changes in said fluid.

6. A stabilizer construction as in claim 1 having its opposite ends connected respectively to two movable parts of a steering mechanism, the respective points of connection between said ends and said parts being selected to impart a predetermined stroke to said piston as the steering mechanism is actuated between its limits.

7. A stabilizer as in claim 1 connected to an extension of the steering knuckle arm and the tie rod of a steering mechanism.

8. A stabilizer as in claim 1 built into the drag link of a steering mechanism.

9. A stabilizer as in claim 1 connected between the pitman lever and drag link of a mechanism.

10. A stabilizer comprising a cyclinder, a hydraulic fluid contained therein, a sleeve disposed about said cylinder and movable with respect thereto, and a piston connected to said sleeve and adapted to reciprocate within said cylinder; said piston having a flow passage and means in said passage normally open but adapted to be closed when a sudden relative movement is established between said piston and cylinder, said piston also including a thermo-responsive and a volume compensating means, said volume compensating means being so located as to be subject at all times to the normal fluid pressure in said cylinder, whereby when the flow of hydraulic fluid takes place through said passage the flow is uniform irrespective of variations of temperature.

11. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and thermo-responsive valve means in said passage normally open but adapted to be closed when a sudden relative movement is established between said piston and cylinder, said piston also including a volume compensating means, said volume compensating means being so located as to be subject at all times to the normal fluid pressure in said cylinder, whereby when the flow of hydraulic fluid takes place through said passage the flow is uniform irrespective of variations of temperature.

12. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and means in said passage normally open but adapted to be closed when a sudden relative movement is established between said piston and cylinder, said piston also including a thermo-responsive means and a bellows-like volume compensating means.

13. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and valve means in said passage normally open but adapted to be closed when a sudden relative movement is established between said piston and cylinder, said piston also including a thermo-responsive and a bellows-like volume compensating means, said thermo-responsive means being built into said valve means.

14. A stabilizer, comprising a cylinder, a hydraulic fluid contained therein, a sleeve disposed about said cylinder and movable with respect thereto, and a piston connected to said sleeve and adapted to reciprocate within said cylinder; said piston having a flow passage and valve means disposed in said passage normally open but adapted to be closed when a sudden relative movement is established between said piston and cylinder, said piston also including a thermo-responsive and a volume compensating means, said thermo-responsive means being built into said valve means and comprising a cup-shaped bimetallic element.

15. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and means in said passage normally open but adapted to be closed when a sudden relative movement is established between said piston and cylinder, said piston also including a plurality of thermo-responsive means and a plurality of volume compensating means, said volume compensating means being so located as to be subject at all times to the normal fluid pressure in said cylinder, whereby when the flow of hydraulic fluid takes place through said passage the flow is uniform irrespective of variations of temperature.

16. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and valve means disposed in said passage normally open but adapted to be closed when a sudden relative movement is established between said piston and cylinder, said valve means being provided with a bleed opening to aid in releasing said valve from its closed position, said piston also including a thermo-responsive means and a volume compensating means, said volume compensating means being so located as to be subject at all times to the normal fluid pressure in said cylinder, whereby when the flow of hydraulic fluid takes place through said passage the flow is uniform irrespective of variations of temperature.

17. A stabilizer comprising a cylinder, a hydraulic fluid contained therein, a sleeve disposed about said cylinder and movable with respect thereto, and a piston connected to said sleeve and adapted to reciprocate within said cylinder; said piston having a flow passage and means in said passage normally open but adapted to be closed when a sudden relative movement is established between said piston and cylinder, said piston also including a plurality of expandable and contractible volume compensating elements, said volume compensating means being so located as to be subject at all times to the normal fluid pressure in said cylinder, whereby when the flow of hydraulic fluid takes place through said passage the flow is uniform irrespective of variations of temperature.

MERTON B. BRIGGS.